Sept. 8, 1964　　H. G. MEISTER, JR., ETAL　　3,147,858
PACKAGE OF ELONGATED ARTICLES FOR VACUUM
PICK-UP, AND PACKAGING MATERIAL
Filed March 20, 1961

INVENTORS.
Harry G. Meister, Jr.
John E. Olson
BY
Buckhorn, Cheatham & Blore
ATTORNEYS

United States Patent Office 3,147,858
Patented Sept. 8, 1964

3,147,858
PACKAGE OF ELONGATED ARTICLES FOR VACUUM PICK-UP, AND PACKAGING MATERIAL
Harry G. Meister, Jr., and John E. Olson, Portland, Oreg., assignors to Hyster Company, Portland, Oreg., a corporation of Nevada
Filed Mar. 20, 1961, Ser. No. 97,035
4 Claims. (Cl. 206—60)

This invention relates to methods of handling laminated loads and also to novel laminated loads to be handled by such method.

Heretofore, difficulty has been experienced in handling laminated loads made up of flexible laminas, such as sheets of gypsum board, paper, metal, etc. Frequently, the laminas are stacked on a pallet or placed in boxes. Sometimes rigid backing members are placed against either side of the stack of laminas and the assembly strapped together. In any event, if the sheets are not handled carefully, they may slip out of place or in the case of sheets like gypsum board, they may break.

It is a main object of the invention to provide a method of handling stacks of flexible laminas which eliminates the need for pallets, boxes, and backing members, etc., and more particularly to provide a method of handling the stacks with the aid of vacuum to temporarily stiffen the stack to make it possible to handle it with the aid of simple handling equipment without danger of slippage or damage to the load.

A further object of the invention is to provide a novel method of stiffening a laminated load.

Another object of the invention is to provide a novel laminated load which can be handled by a suction device.

Various other objects of the invention will be apparent from the following description taken in connection with the accompanying drawings wherein.

It is well known that bending stresses in a beam develop horizontal shear within the beam and deflection in the beam is dependent on the internal shear resistance of the beam. A pile of laminates such as shown at 1 in FIG. 1 acts as a beam and naturally tends to deflect of its own weight. In the process of deflecting, each laminate slides horizontally on the adjacent laminates and the entire stack under ordinary conditions has little more stiffness than a single laminate because no member gains support from the others. Under the present invention, we wrap the stack of laminates in a relatively impervious membrane and create a partial vacuum within the package while the stack is lying on a firm flat support. As a result of the low pressure within the package, the ambient atmospheric pressure presses the laminates together with sufficient force to prevent one from sliding on another. This immediately stiffens or "freezes" the stack of separate laminates into a rigid unitary mass which is nearly as stiff as the stack would be if it were a homogeneous mass made of the same material. In the case shown in FIG. 1, for example, the stack of laminates can be supported from one end, both ends, or the middle without undue deflection and readily transported from one place to another. The laminates are referred to by the letter L.

Figure 1:
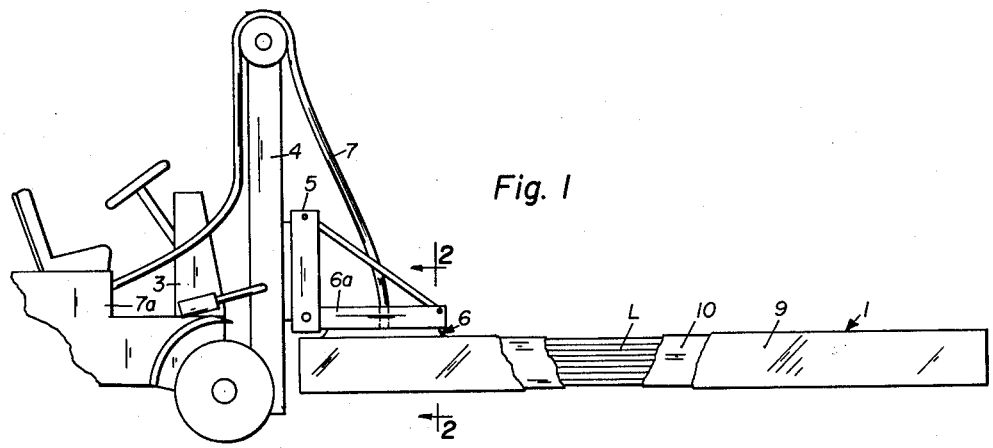
FIG. 1 shows a lift truck carrying a laminated package by means of a large vacuum cup attached to the carriage, parts being broken away for convenience in illustration.

In FIG. 1 we show a lift truck 3 equipped with the conventional upright 4 and the carriage 5. Attached to the carriage is a vacuum cup or suction device 6 comprising a rigid plate 6a having a peripheral elastomer seal 6b. Connected to the vacuum cup through hose 7 is a vacuum pump 7a on the lift truck. A small hole or cut 8 (FIG. 2) is made in the wrapper 9 of the package somewhere within the confines of the vacuum cup. Through this medium, a vacuum is drawn within the package. This vacuum serves a double purpose: first it stiffens the package as described and second, it creates a low pressure area on that part of the package which lies under the vacuum cup and thus permits the package to be lifted bodily by the vacuum cup.

If the package is a long one, for example like that shown in FIG. 1, the wrapipng filament has a tendency to adhere so tightly to the contents of the package that it impedes the passage of air to the vacuum cup which may be some distance away. We overcome this problem by providing a layer of ordinary corrugated paper between the outer filament 9, which may also be paper, and the contents. We prefer to lay the corrugations lengthwise of the package because this creates the least amount of resistance to the passage of air as it is drawn into the vacuum head. The paper of which corrugated board is made, however, is normally very porous in nature and will therefore also allow the passage of air across the corrugations although in somewhat reduced volume. Because of this characteristic of corrugated board, any of the air within the package, regardless of its origin, can readily find it way to the vacum head and hence be evacuated from the package.

Figure 2:
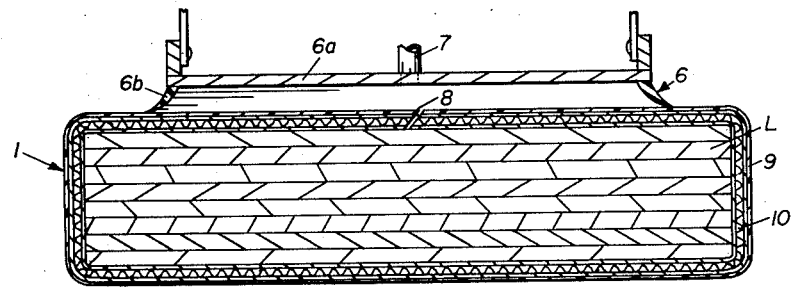
FIG. 2 shows an enlarged cross section taken at line 2—2 of FIG. 1.

The wrapping shown in FIG. 2 consists of a layer of corrugated board 10 surrounded by a relatively impervious membrane 9. This membrane may be a plastic such as polyethylene or it may be a treated paper or a laminated paper which consists of two layers of kraft paper with latex or asphalt between them. In cases where the package is not too large and the pump is therefore capable of tolerating considerable infiltration of air, we find that ordinary kraft paper will work satisfactorily.

Figure 3:
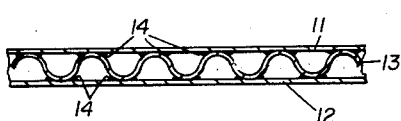
FIG. 3 shows an enlarged cross section of a piece of standard corrugated board sometimes used in the method described.

As a refinement, we sometimes use a special corrugated board as shown in FIG. 3 about to be described.

Figure 4:
FIG. 4 shows a specially constructed corrugated board sometimes used in the method described.

Ordinary corrugated board consists of upper and lower sheets 11 and 12 of relatively pervious paper held together by a corrugated sheet 13. Glue is applied to the corrugated sheet at the peaks and valleys of the corrugations as shown at 14. We have found that the glue forms a very satisfactory material for rendering the paper impervious, so we apply a film of glue 15 over the entire upper sheet 11A, FIG. 4 but we apply glue to the valleys only of the corrugated sheet as shown at 16 to allow air to pass through the sheet 12. Thus, we can provide a relatively impervious outer wrapping at very little additional expense and can eliminate wrapping filament or membrane 9 of FIG. 2.

Figure 5:
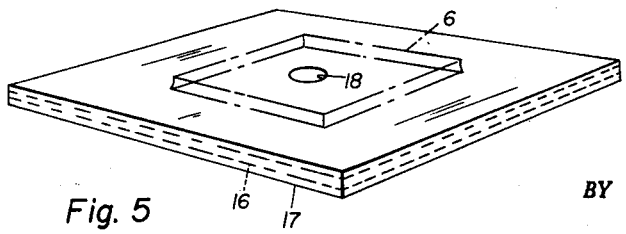
FIG. 5 is a three dimensional view of a wrapped stack of paper sheets showing the same in relation to the suction device which picks the stack up.

FIG. 5 shows a stack of paper sheets 16 enclosed within a wrapper or covering 17 of the type heretofore described. The wrapper or covering is provided with an opening 18 through which air may be withdrawn from the package. The reference numeral 6 indicates the position which the suction device or vacuum cup will assume in picking up the stack of paper sheets.

One point to be made in connection with FIGS. 1 and 5 is that it is apparent that in each case a lifting force is applied to only part of the load. Even though this is so, because of the partial vacuum created within the covering of the load, the load is made stiff enough so that it can be lifted in such fashion without difficulty.

Various other applications of this method of handling a structural member which can be either flexible or stiff at will, will appear obvious and should be considered within the scope of this invention.

We claim:

1. Wrapping corrugated board for use in lifting loads with the aid of a partial vacuum drawn in a package formed by enclosing said load with said board, comprising a corrugated board having two outer faces and a corrugated piece between said faces, one face having the apices of the opposed portions of the corrugated piece secured to the face, the other face having the inner surface thereof completely coated with an adhesive material which forms an air sealing medium and also secures the adjacent apices to said other face, said board being adapted to have an opening provided therethrough and through which air may be evacuated from a load enclosed by said board.

2. A package comprising, a load to be lifted comprising a stack of elongate flexible articles individually incapable of remaining horizontally straight when picked up by one end, a covering for said load, said covering comprising a layer of corrugated paperboard having two outer layers and a corrugated piece between said layers, one layer having the apices of the opposed portions of the corrugated piece secured thereto, the other layer having the inner surface thereof completely coated with an adhesive material which forms an air sealing medium and also secures the adjacent apices to said other layer, said other layer being disposed outwardly with respect to said one layer and said load, said corrugated paperboard having an opening formed therein to adapt the package to be picked up by means of a suction head placed over such opening.

3. A package comprising a plurality of substantially horizontally extending elongate articles which individually have insufficient strength to remain straight when picked up by one end but which collectively can form when united a substantially rigid beam, said article being arranged side-by-side to form a pile thereof, a wrapping of corrugated, air permeable paperboard completely surrounding said pile whereby said paperboard wrapping defines passageway means for flow of air lengthwise of said pile, and means spaced outwardly of said passageway means and substantially completely enclosing said pile defining an air impervious membrane to prevent ingress or egress of air to said passageway to the ambient air, said last mentioned means and said paperboard having an opening therethrough immediately adjacent one end of said package through which air confined within said membrane means may be withdrawn therefrom whereby the air pressure upon the exterior of said package forces said articles together to unitize them and effect a substantial increase in horizontal shear between said articles to form, in effect, a single beam capable of remaining substantially straight when lifted by one end thereof.

4. A package as set forth in claim 3 in which the last named means comprises a separate sheet of air-impervious flexible material wrapped about the corrugated paperboard and load, and wherein the paperboard and sheet have matching openings adjacent one end of the stack in opposed relation to one face of the stack to enable a sub-atmospheric pressure to be created within the covering around the load to consolidate the load to enable the load to be handled.

References Cited in the file of this patent

UNITED STATES PATENTS

| | | |
|---|---|---|
| 999,905 | Suppes | Aug. 8, 1911 |
| 1,431,702 | Smend et al. | Oct. 10, 1922 |
| 2,535,422 | Jones | Dec. 26, 1950 |
| 2,584,241 | Stewart | Feb. 5, 1952 |
| 2,709,519 | Cushman | May 31, 1955 |
| 2,757,790 | Gattuso | Aug. 7, 1956 |
| 2,758,047 | Dowd | Aug. 7, 1956 |
| 2,893,581 | Cushman | July 7, 1959 |
| 2,929,523 | Cushman | Mar. 22, 1960 |
| 2,974,716 | Fourness | Mar. 14, 1961 |
| 3,040,920 | Harris | June 26, 1962 |
| 3,054,521 | Harris et al. | Sept. 18, 1962 |
| 3,085,731 | Wilkins | Apr. 16, 1963 |